March 9, 1926.

A. J. OWSLEY

BUMPER

F led Oct. 10, 1925

INVENTOR
A. J. Owsley
BY Victor J. Evans
ATTORNEY

WITNESS:

March 9, 1926.

A. J. OWSLEY

BUMPER

Filed Oct. 10, 1925

A. J. Owsley INVENTOR

Patented Mar. 9, 1926.

1,576,354

UNITED STATES PATENT OFFICE.

ARTHUR JAMES OWSLEY, OF GARY, INDIANA.

BUMPER.

Application filed October 10, 1925. Serial No. 61,735.

*To all whom it may concern:*

Be it known that I, ARTHUR JAMES OWSLEY, a citizen of the United States, residing at Gary, in the county of Lake and State of Indiana, have invented new and useful Improvements in Bumpers, of which the following is a specification.

It is the purpose of this invention to provide a safety bumper for vehicles, the bumper essentially embodying two sections so connected together and mounted upon the frame of the vehicle that they may be arranged normally parallel in advance of the vehicle, or in right angular relation in an emergency, so that if anyone happens to be struck by the vehicle, said person will be caught in and carried by the bumper without injury.

In carrying out the invention it is my purpose to provide a safety bumper of the character above mentioned, wherein the sections of the bumper are capable of relative adjustments to cause them to assume different positions under different circumstances, the adjustment of these sections being controlled by means including a lever arranged within the vehicles in convenient reach of the operator.

The nature and advantages of the invention will be better understood when the following detailed description is read in connection with the accompanying drawing, the invention residing in the construction, combination and arrangement of parts as claimed.

In the drawing forming part of this application, like numerals of reference indicate similar parts in the several views, and wherein:

Figure 4 is a sectional view through one part of the bumper.

Figure 1:
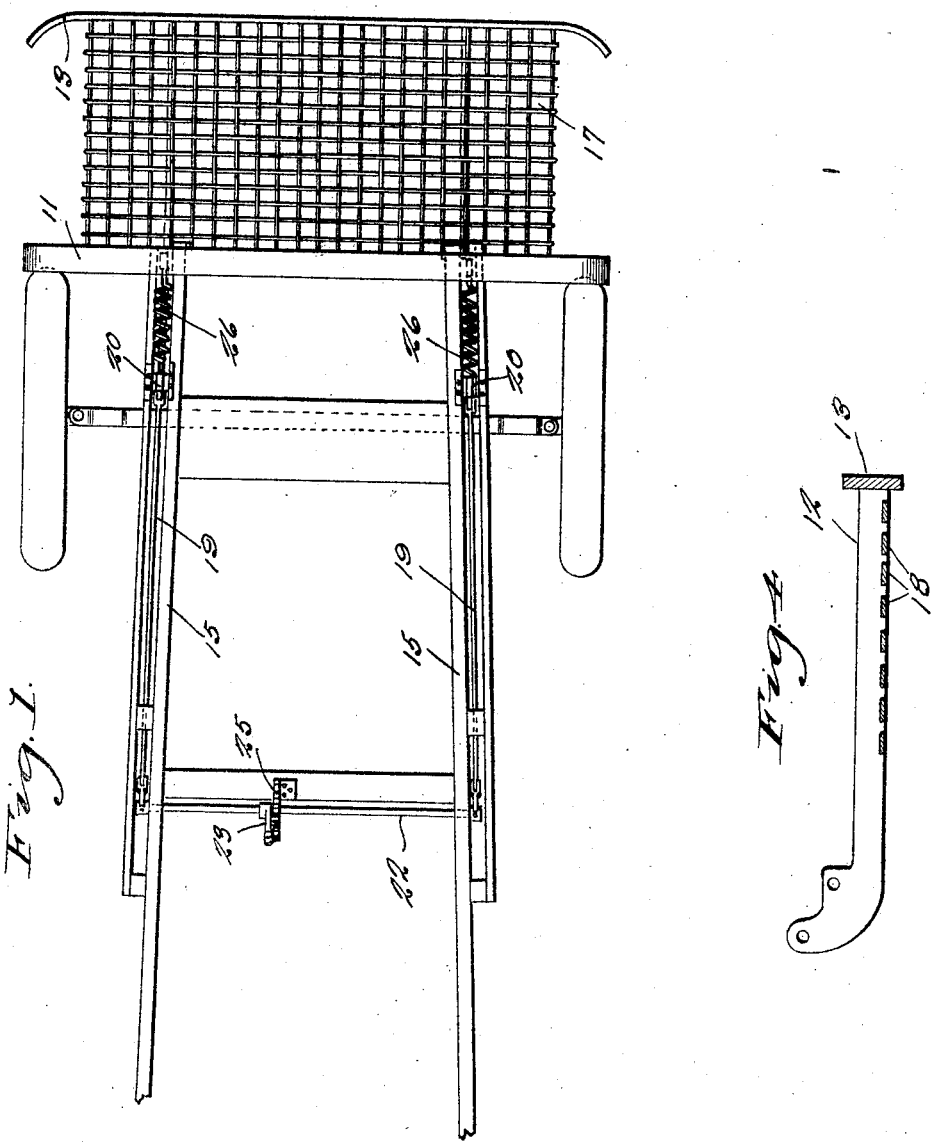
Figure 1 is a fragmentary plan view of a vehicle frame showing my improved bumper mounted thereon.
Figure 2:
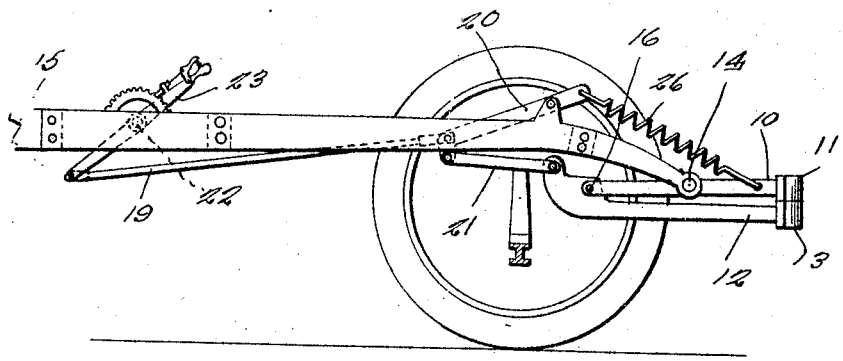
Figure 2 is a view taken at a right angle to Figure 1 showing the normal position of the bumper sections.

The bumper embodies two sections arranged one above the other, and mounted to assume the different positions above enumerated. The upper section includes spaced side members 10 and a cross bar 11, while the lower section includes spaced side members 12 and a cross bar 13. The side members 10 of the upper section are pivoted as at 14 upon the forward end of the frame 15 of the vehicle, these members being pivoted at appropriate points in their length and having their lower ends pivoted as at 16 to the adjacent side members 12 of the lower section. The cross bars 11 and 13, respectively, of said sections are connected by a sheet of fabric 17 adapted to be extended in a manner illustrated in Figure 3 when the upper section is arranged at a right angle to the lower section, so that should anyone be struck by the bumper the fabric 17 would yield to catch and hold said person, and carry said person in safety until the vehicle is brought to a stop. It will be noted upon inspection of Figure 4 that the side members 12 of the lower section are connected together by spaced slats or the like 18 upon which the fabric 17 is adapted to repose when folded incident to the lowering of the upper section to a position in parallelism with the lower section, as shown in Figure 2. The lower section is adapted to be raised and lowered in a horizontal plane with relation to the ground, and manifestly when this section is so adjusted the upper section 12 by reason of its pivotal connection with the frame and lower section is moved to one or the other of its active positions.

Figure 3:
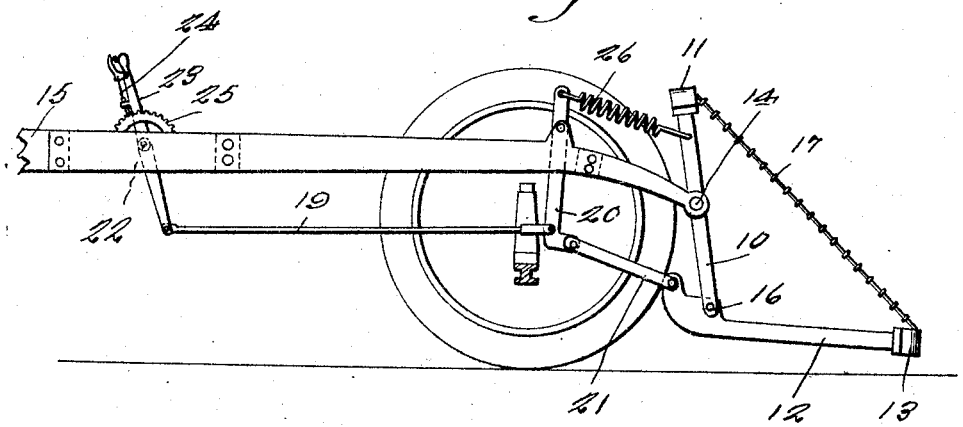
Figure 3 is a view showing the sections of the bumper arranged in right angular relation for the purpose above specified.

While any suitable means may be employed for controlling the movements of the bumper sections, I preferably make use of a pair of spaced rods 19 arranged at the opposite sides of the vehicle, while the corresponding forward extremities of these rods are pivotally connected with levers 20 pivoted on the frame of the vehicle, as clearly shown in Figures 2 and 3. These levers are pivoted at points between their ends, so as to extend above and below the frame of the vehicle when occupying vertical positions, and it will be noted that the rods 19 are connected with these levers adjacent the lower ends thereof. Each lever 20 has its lower end connected with the adjacent end of the lower section of the bumper through the instrumentality of a link 21, so that when the levers 20 are swung upon their pivots movement is imparted to the lower section to either raise or lower said section with relation to the ground, this, of course, depending upon the particular direction in which the levers 20 are moved. The levers 20 are simultaneously operated because of the fact that the rods 19 have their inner extremities connected together by a cross bar 22 which in turn is connected with the lower end of a manually operable lever 23 arranged within the vehicle and in convenient reach of the operator. The lever carries a movable hand operated pawl 24 adapted to cooperate with the rack bar 25 for the purpose of holding the lever in any given position. Coiled springs 26 connect the upper ends of the levers 20 with the side members 10 of the upper section, so that independently of the position the upper section occupies with relation to the lower section, the springs afford sufficient tension to assist in folding said sections immovable in their given positions with a view of minimizing rattling of the bumper.

In practice, the respective sections of the bumper normally project forwardly in advance of the vehicle and in parallelism, with the cross bar 11 of the upper section reposing upon the corresponding bar of the lower section. In this position of parts the bumper is used in the ordinary well known manner, but in case of an emergency, where it seems that someone will be struck with the vehicle, it is only necessary for the operator to swing the lever 23 upon its pivot from the position shown in Figure 2 to the position illustrated in Figure 3. During this movement of the lever the lower section of the bumper is lowered toward the ground to occupy a position in close proximity thereto, while the upper section is swung upon its pivot to occupy the position shown in Figure 3, whereupon the fabric 17 is extended to catch and hold said person without injury until the vehicle is brought to a stop.

While it is believed that from the foregoing description the nature and advantages of the invention will be readily apparent, I desire to have it understood that I do not limit myself to what is herein shown and described, and that such changes may be resorted to when desired as fall within the scope of what is claimed.

Having thus described the invention, what is claimed as new, is:—

1. A safety bumper for vehicles comprising two sections pivotally mounted upon the vehicle, and also pivotally connected together in a manner whereby said sections can be simultaneously adjusted to cause said sections to occupy parallel positions in advance of the vehicle, or positions at right angles to each other, a sheet of fabric connecting the outer extremities of said sections and adapted to be extended when the latter assumes the latter mentioned position, and adapted to be folded or collapsed when the sections are arranged parallel, slats forming part of the lowermost section and upon which said fabric is adapted to repose when folded, and means operable from within the vehicle for controlling the movements of said sections.

2. A safety bumper for vehicles comprising two sections pivotally mounted upon the vehicle, and also pivotally connected together in a manner whereby said sections can be simultaneously adjusted to cause said sections to occupy parallel positions in advance of the vehicle, or positions at right angles to each other, with the lower horizontal section close to the ground, a sheet of fabric connecting the outer extremities of said sections, and means connected with said lower sections and operable from within the vehicle for controlling the adjustment of said sections.

In testimony whereof I affix my signature.

ARTHUR JAMES OWSLEY.